United States Patent
Spenninger et al.

(10) Patent No.: US 12,311,538 B2
(45) Date of Patent: May 27, 2025

(54) METHOD FOR DETERMINING A WEIGHT AND A CENTER OF GRAVITY OF A ROBOT MANIPULATOR LOAD

(71) Applicant: FRANKA EMIKA GMBH, Munich (DE)

(72) Inventors: Andreas Spenninger, Karlsfeld (DE); Fangyi Streitel, Munich (DE)

(73) Assignee: Franka Emika GmbH, Munich (DE)

( * ) Notice: Subject to any disclaimer, the term of this patent is extended or adjusted under 35 U.S.C. 154(b) by 503 days.

(21) Appl. No.: 17/420,017

(22) PCT Filed: Jan. 22, 2020

(86) PCT No.: PCT/EP2020/051453
§ 371 (c)(1),
(2) Date: Jun. 30, 2021

(87) PCT Pub. No.: WO2020/152191
PCT Pub. Date: Jul. 30, 2020

(65) Prior Publication Data
US 2022/0088804 A1 Mar. 24, 2022

(30) Foreign Application Priority Data

Jan. 23, 2019 (DE) .................. 10 2019 101 595.2

(51) Int. Cl.
*B25J 9/16* (2006.01)
*B25J 19/02* (2006.01)
*G01G 19/52* (2006.01)
*G01M 1/12* (2006.01)

(52) U.S. Cl.
CPC ............. *B25J 19/02* (2013.01); *B25J 9/1638* (2013.01); *G01G 19/52* (2013.01); *G01M 1/122* (2013.01)

(58) Field of Classification Search
CPC ........ B25J 19/02; B25J 9/1638; B25J 9/1653; G01G 19/52; G01M 1/122; G05B 2219/39194
See application file for complete search history.

(56) References Cited

U.S. PATENT DOCUMENTS

| | | |
|---|---|---|
| 2008/0301872 A1 | 12/2008 | Fahrig et al. |
| 2013/0061695 A1* | 3/2013 | Sato ..................... G01G 9/00 73/865 |

(Continued)

FOREIGN PATENT DOCUMENTS

| | | |
|---|---|---|
| DE | 102007026114 A1 | 12/2008 |
| DE | 102014005758 A1 | 10/2014 |

(Continued)

OTHER PUBLICATIONS

English translation of International Preliminary Report on Patentability issued in International Application No. PCT/EP2020/051453 on Aug. 5, 2021.

*Primary Examiner* — Abby Y Lin
*Assistant Examiner* — Dylan M Katz
(74) *Attorney, Agent, or Firm* — Hoffmann & Baron, LLP

(57) ABSTRACT

A method of determining a weight and a center of gravity of a load for a robot manipulator, the method including: gripping the load using an end effector; moving the load into a number n of distinct static poses; determining an external wrench wrench $F_{ext}$ for each of the n static poses; determining, in a base coordinate system, at least components of each external wrench $F_{ext}$ that indicate the external forces; determining a particular estimation of the weight of the load from a particular component pointing in a direction of a gravity vector from among the components of each external wrench $F_{ext}$ that indicate the external forces in the base coordinate system, and from a magnitude of the gravity vector; determining the weight of the load by averaging respective (Continued)

estimations of the weight of the load; determining estimations of coordinates of the center of gravity of the load for each of the n static poses based on the weight of the load or the particular estimation of the weight of the load determined for a particular static pose and based on the components of the external wrench $F_{ext}$ that indicate externally acting torques; and determining the center of gravity of the load by averaging respective estimations of coordinates of the center of gravity.

20 Claims, 2 Drawing Sheets

(56) References Cited

U.S. PATENT DOCUMENTS

| | | | |
|---|---|---|---|
| 2014/0025205 A1* | 1/2014 | Inazumi | B25J 9/1694 |
| | | | 700/258 |
| 2014/0316573 A1 | 10/2014 | Iwatake | |
| 2015/0360368 A1* | 12/2015 | Shin | B25J 13/088 |
| | | | 700/253 |
| 2017/0028555 A1 | 2/2017 | Kokubo | |
| 2018/0021955 A1 | 1/2018 | Hatanaka | |
| 2018/0169854 A1 | 6/2018 | Shiratsuchi | |
| 2018/0200885 A1 | 7/2018 | Ikeda et al. | |
| 2019/0321990 A1* | 10/2019 | Naitou | G01G 23/00 |
| 2020/0171673 A1* | 6/2020 | Moosman | B25J 13/085 |

FOREIGN PATENT DOCUMENTS

| | | |
|---|---|---|
| DE | 102016008866 A1 | 2/2017 |
| DE | 102017115715 A1 | 1/2018 |
| DE | 102018200249 A1 | 7/2018 |
| DE | 112016002797 B4 | 12/2019 |
| JP | 2012-115912 A | 6/2012 |

* cited by examiner

METHOD FOR DETERMINING A WEIGHT AND A CENTER OF GRAVITY OF A ROBOT MANIPULATOR LOAD

CROSS-REFERENCE TO RELATED APPLICATIONS

The present application is the U.S. National Phase of PCT/EP2020/051453, filed on Jan. 22, 2020, which claims priority to German Patent Application No. 10 2019 101 595.2, filed on Jan. 23, 2019, the entire contents of which are incorporated herein by reference.

BACKGROUND

Field

The invention relates to a method for determining a weight and a center of gravity of a load for a robot manipulator and a system for determining a weight and a center of gravity of a load for a robot manipulator.

SUMMARY

The problem addressed by the invention is that of determining a weight and a center of gravity of a load for a robot manipulator.

The invention is defined by the features of the independent claims. Advantageous developments and embodiments are the subject matter of the dependent claims.

A first aspect of the invention relates to a method for determining a weight and a center of gravity of a load for a robot manipulator. The robot manipulator is arranged on a base and has a plurality of links. The links are connected to one another by joints. Actuators are arranged on the joints in order to rotate or tilt the respective links arranged on one of the joints relative to one another. The robot manipulator also has an end effector for gripping the load. The method according to the first aspect of the invention includes:
gripping the load by the end effector;
moving the load into a number n of distinct static poses;
determining an external wrench $F_{ext}$ for each of the n static poses, wherein the respective external wrench $F_{ext}$ specifies external forces and torques acting on the robot manipulator;
determining, in a base coordinate system, at least components of each external wrench $F_{ext}$ that indicate the external forces, wherein the base coordinate system is a Cartesian coordinate system and imagined to be arranged in a body-fixed manner on the base of the robot manipulator, and wherein an axis of the base coordinate system is parallel to a gravity vector;
determining a particular estimation of the weight of the load for each of the n static poses from a particular component pointing in a direction of the gravity vector from among the components of each external wrench $F_{ext}$ that indicate the external forces in the base coordinate system;
determining the weight of the load by averaging respective estimations of the weight of the load;
determining estimations of coordinates of the center of gravity of the load for each of the n static poses based on the weight of the load or the particular estimation of the weight of the load determined for the particular static pose and based on the components of the external wrench $F_{ext}$ that indicate the externally acting torques; and
determining the center of gravity of the load by averaging respective estimations of coordinates of the center of gravity.

An orientation of the base coordinate system is at least aligned such that one axis of the base coordinate system points in the direction of the local gravity vector. The base coordinate system is preferably calibrated accordingly when setting up the robot manipulator. Determining, in the base coordinate system, at least the components of each external wrench $F_{ext}$ that indicate the external forces is in particular equal to transforming the external wrench $F_{ext}$ by means of a corresponding coordinate system transformation such that exactly one force-indicating component of the external wrench $F_{ext}$ is defined exactly in the direction of the local gravity vector because in this case, a base coordinate system oriented along the gravity vector is also implicitly defined. The local gravity vector is the vector which in particular indicates the direction of the gravity acting at the given location on earth.

A static pose is maintained for a specific period of time. This allows for a static measurement of forces and torques without the need to also detect dynamic forces and torques such as Coriolis forces, tangential accelerations, or centrifugal forces. Therefore, the respective external wrench $F_{ext}$ for the static poses also does not contain any dynamic forces and torques. The external wrench $F_{ext}$ shows all external force and torque influences with regard to the static poses, including the weight of the load. However, the external wrench $F_{ext}$ does not contain the weight of the robot manipulator, including the end effector. Consequently, in a static pose of the robot manipulator without a load accommodated in the end effector, the external wrench $F_{ext}$ corresponds to a zero vector.

The center of gravity is a point-like location, i.e., when determining the center of gravity, a position vector is determined for this point-like location, the center of gravity. The starting point of this position vector lies in particular at the origin of the respective coordinate system in which this position vector is indicated.

When determining the weight of the load, the robot manipulator itself advantageously acts as a scale in order to determine the weight of the mass of the load. In this case, determining a weight is entirely equal to determining the mass because weight and mass of the load are connected to one another via the location factor $g \approx 9.8$ m/s².

It is an advantageous effect of the invention that a weight and a center of gravity of a load can be efficiently determined for a robot manipulator.

According to an advantageous embodiment, the load is moved into a number n of distinct static poses only by controlling k actuators, with k≤n, wherein the number k is a predefined quantity and the k actuators are arranged on or assigned to the k joints closest to the end effector. According to a further advantageous embodiment, k=3 and the movement of the load takes place in a number n of distinct static poses only by controlling three actuators of the three joints closest to the end effector. According to a further advantageous embodiment, k=2 and the movement of the load takes place in a number n of distinct static poses only by controlling two actuators of the two joints closest to the end effector. The step of moving the load is advantageously carried out only on a very small portion of space.

According to a further advantageous embodiment, the load is moved into a number n of distinct static poses only by controlling k actuators, with k≤n, wherein the number k is a predefined quantity.

Advantageously, k=2 and the movement of the load into a number n of distinct static poses takes place only by controlling the first actuator and the third actuator of the three joints closest to the end effector.

According to a further advantageous embodiment, the steps for determining a weight and a center of gravity of a load for a robot manipulator are carried out automatically in response to the input signal from a user.

According to a further advantageous embodiment, the n static poses are automatically passed by the robot manipulator and superimposed onto another movement, wherein the other movement is preferably a manual guiding of the robot manipulator.

According to a further advantageous embodiment, the steps for determining a weight and a center of gravity of a load for a robot manipulator are carried out during a manual guiding of the robot manipulator. In this case, the static poses are automatically selected when available.

According to a further advantageous embodiment, the external wrench $F_{ext}$ is determined by torque sensors in the joints.

The torque sensors are advantageously integrated into electrical actuators of the actuatorically rotatable joints. In particular, by measuring the electric current in electrical actuators, torques can be detected therein.

According to a further advantageous embodiment, the external wrench $F_{ext}$ is determined using strain gauges on the joints or on the links.

According to a further advantageous embodiment, the load is moved several times from distinct directions into a number m of the n static poses, with m≤n.

In this way, hysteresis effects can advantageously be averaged from the respective force or torque sensors and thus be eliminated from the measurements of the external wrench $F_{ext}$. The hysteresis effects originate in particular from the friction and inertia of the "robot manipulator" system. Depending on the direction from which such a pose is approached, different values are measured by the respective force or torque sensors. Accordingly, if a symmetrical movement takes place into the desired pose from different directions, it is thus possible to eliminate the measurement error caused by the respective hysteresis effect when detecting the external wrench $F_{ext}$.

According to a further advantageous embodiment, n=8.

According to a further advantageous embodiment, an external wrench $F_{ext}$ is determined for each of the n static poses in an end effector coordinate system that is body-fixed to the end effector, and for determining at least the components of each external wrench $F_{ext}$ that indicate the forces, a system transformation takes place in the base coordinate system between the end effector coordinate system and the base coordinate system.

According to a further advantageous embodiment, estimations for coordinates of the center of gravity of the load are determined for each of the n static poses in an end effector coordinate system that is body-fixed to the end effector.

The end effector coordinate system is imagined to be arranged in a body-fixed manner on the end effector. When the end effector moves, the end effector coordinate system thus rotates together with the end effector. The end effector coordinate system therefore has no relative movement with respect to the end effector.

According to a further advantageous embodiment, the center of gravity of the load is determined by arithmetic averaging of the respective estimations of the coordinates of the center of gravity of the load.

According to a further advantageous embodiment, the weight of the load is determined by arithmetic averaging of the respective estimations of the weight of the load.

According to an advantageous embodiment, the method furthermore includes:
    adjusting a control system of the robot manipulator on the basis of the weight of the load and/or the center of gravity of the load.

According to a further advantageous embodiment, the control system is adjusted by adjusting at least one control parameter.

A control parameter is in particular a return gain, a forward branch gain, or a modeled dead time.

According to a further advantageous embodiment, the method also includes:
    planning and executing a movement path of the load and a respective pose of the load while traveling along the movement path, taking into account the center of gravity of the load, so that a torque acting at least on the end effector joint is reduced.

According to a further advantageous embodiment, the method also includes:
    determining a maximum path velocity of the load on the basis of the mass, so that a predetermined maximum translational impulse of the load is not exceeded.

According to a further advantageous embodiment, the method includes:
    determining a maximum rotational speed of the load on the basis of the center of gravity of the load and/or the mass of the load, so that a predetermined maximum angular momentum of the load is not exceeded.

A further aspect of the invention relates to a system to determine a weight and a center of gravity of a load for a robot manipulator, wherein the robot manipulator is arranged on a base and has a plurality of links, and the links are connected to one another by joints and rotatable relative to one another by actuators arranged on the joints, and wherein the robot manipulator has:
    an end effector designed to grip the load;
    a control unit designed to control the actuators arranged on the joints for moving the load into a number n of distinct static poses;
    an estimation unit designed to determine an external wrench $F_{ext}$ for each of the n static poses, wherein the respective external wrench $F_{ext}$ indicates external forces and torques acting on the robot manipulator and
    a processing unit designed to:
    a) indicate at least components of each external wrench $F_{ext}$ that indicate the forces to be indicated in a base coordinate system, wherein the base coordinate system is a Cartesian coordinate system and arranged in a body-fixed manner on the base of the robot manipulator, and an axis of the base coordinate system is parallel to a gravity vector;
    b) determine a particular estimation of the weight of the load from a particular component pointing in a direction of the gravity vector from among the components in the base coordinate system that indicate the external forces of each external wrench $F_{ext}$, and from the magnitude of the gravity vector;
    c) determine a weight of the load by averaging respective estimations of the weight of the load;
    d) determine estimations of coordinates of the center of gravity of the load for each of the n static poses based on the weight of the load or the particular estimation of the weight of the load determined for a particular static pose and based on the components of the external wrench $F_{ext}$ that indicate the externally acting torques; and e) determine the center of gravity of the load by averaging respective estimations of coordinates of the center of gravity.

According to a further advantageous embodiment, the robot manipulator has torque sensors which are designed to determine torques in the joints, wherein the processing unit is designed to determine the external wrench $F_{ext}$ from the torques in the joints.

Advantageously, the torque sensors are integrated in electrical actuators of the joints. In particular, by measuring the electric current in electrical actuators, torques can be detected therein.

According to a further advantageous embodiment, the robot manipulator has strain gauges on the joints or on the links, wherein the strain gauges are each designed to detect tensions in the supporting material of the robot manipulator and to transmit them to the processing unit, wherein the processing unit is designed to use the detected voltages to determine the external wrench $F_{ext}$.

According to a further advantageous embodiment, the control unit is designed to control the actuators arranged on the joints for moving the load into a number m of the n static poses, with m≤n, from distinct directions.

According to a further advantageous embodiment, the processing unit is designed to determine the respective external wrench $F_{ext}$ for each of the n static poses in an end effector coordinate system that is body-fixed to the end effector, and to carry out a system transformation between the end effector coordinate system and the base coordinate system in the base coordinate system for determining at least the components of each external wrench $F_{ext}$ that indicate the forces.

According to a further advantageous embodiment, the processing unit is designed to determine estimations for coordinates of the center of gravity of the load for each of the n static poses in an end effector coordinate system that is body-fixed to the end effector.

According to a further advantageous embodiment, the processing unit is designed to determine the center of gravity of the load by arithmetic averaging of the respective estimations of the coordinates of the center of gravity of the load.

According to a further advantageous embodiment, the processing unit is designed to determine the weight of the load by arithmetically averaging the respective estimations of the weight of the load.

Advantages and preferred developments of the proposed system can be derived from an analogous and corresponding transfer of the statements made above in connection with the proposed method.

Further advantages, features and details can be derived from the following description, in which—with reference to the drawings, if necessary—at least one embodiment is described in detail. Identical, similar, and/or functionally identical parts are denoted with the same reference signs.

The illustrations in the figures are schematic and not to scale.

DETAILED DESCRIPTION

Figure 1:
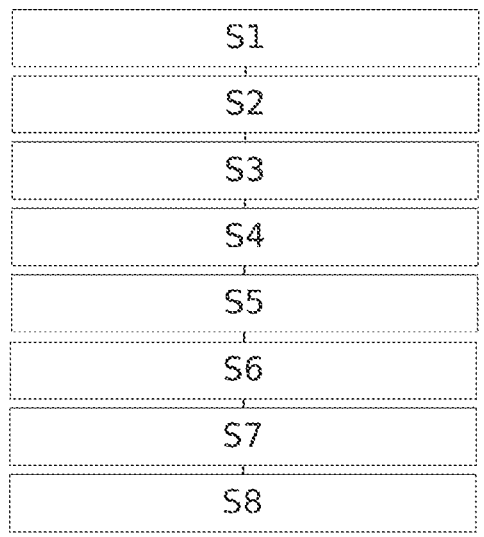
FIG. 1 shows a method for determining a weight and a center of gravity of a load for a robot manipulator according to one embodiment of the invention.

FIG. 1 shows a method for determining a weight and a center of gravity of a load 11 for a robot manipulator 1, wherein the robot manipulator 1 is arranged on a base 3 and has a plurality of links 5, and the links 5 are connected to one another by joints 7 and rotatable relative to one another by actuators 6 on the joints 5, and wherein the robot manipulator 1 has an end effector 9 for gripping the load 11. The method includes:

gripping S1 the load 11 by means of the end effector 9;

moving S2 the load 11 into a number n of distinct static poses;

determining S3 an external wrench $F_{ext}$ for each of the n static poses, wherein the respective external wrench $F_{ext}$ indicates external forces and torques acting on the robot manipulator 1;

determining S4, in a base coordinate system, at least the components of each external wrench $F_{ext}$ that indicate the external forces, wherein the base coordinate system is a Cartesian coordinate system and arranged in a body-fixed manner on the base 3 of the robot manipulator 1, and an axis of the base coordinate system is parallel to a gravity vector;

determining S5 a particular estimation of the weight of the load 11 from the particular component pointing in the direction of the gravity vector from among the components of each external wrench $F_{ext}$ that indicate the external forces in the base coordinate system;

determining S6 the weight of the load 11 by averaging the respective estimations of the weight of the load 11;

determining S7 estimations of coordinates of the center of gravity of the load 11 for each of the n static poses on the basis of the weight of the load 11 or the particular estimation of the weight of the load 11 determined for the particular static pose and on the basis of the components of the external wrench $F_{ext}$ that indicate the externally acting torques; and determining S8 the center of gravity of the load 11 by averaging the respective estimations of coordinates of the center of gravity.

Figure 2:
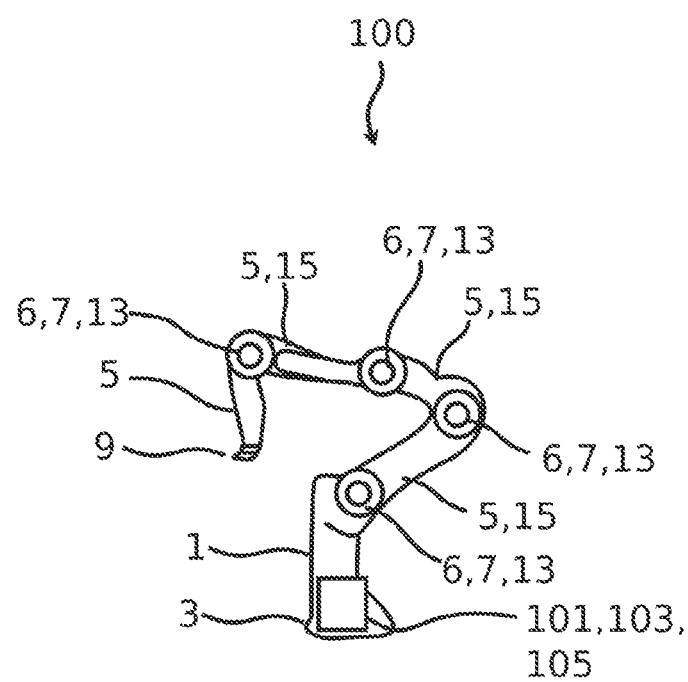
FIG. 2 shows a system for determining a weight and a center of gravity of a load for a robot manipulator according to a further embodiment of the invention.
Figure 3A:
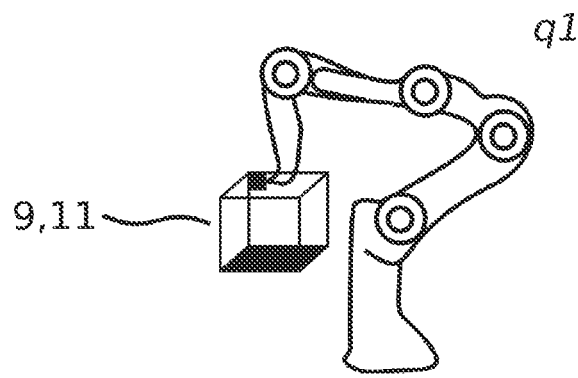
FIGS. 3A-3D show symbolically depicted static poses in addition to the method described in FIG. 1.
Figure 3B:
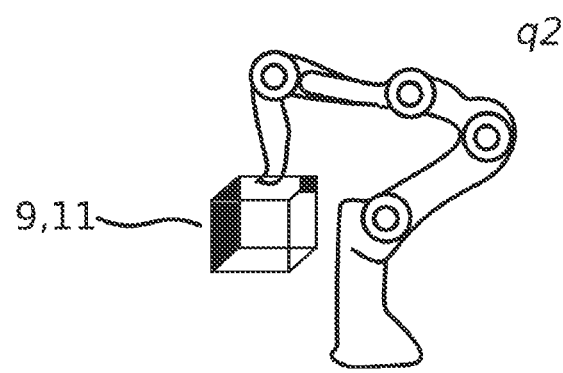
Figure 3C:
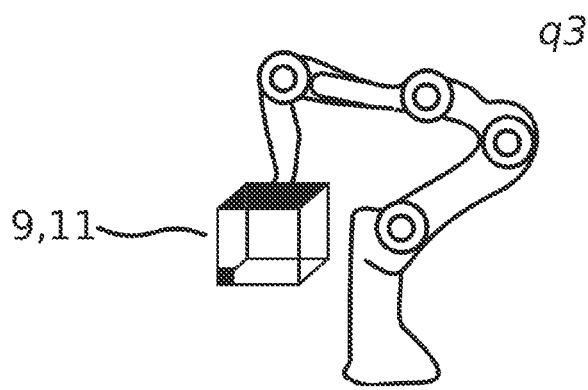
Figure 3D:
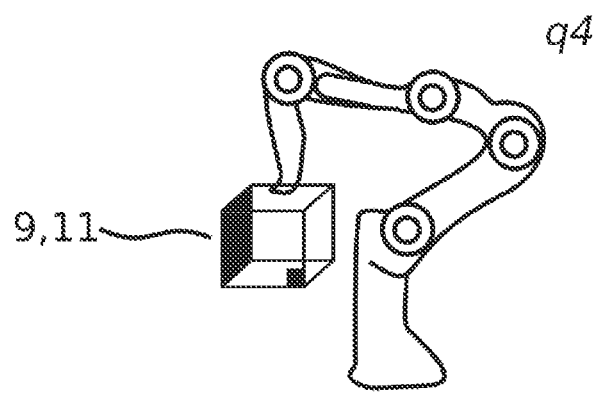

FIG. 2 shows a system 100 for determining a weight and a center of gravity of a load 11 for a robot manipulator 1, wherein the robot manipulator 1 is arranged on a base 3 and has a plurality of links 5, and the links 5 are connected to one another by joints 7 and rotatable relative to one another by actuators 6 arranged on the joints 7. The robot manipulator 1 includes the following:

an end effector 9 designed to grip the load 11, a control unit 101 designed to control the actuators 6 arranged on the joints 7 for moving the load 11 into a number n of distinct static poses, an estimation unit 103 designed to determine an external wrench $F_{ext}$ for each of the n static poses, wherein the respective external wrench $F_{ext}$ indicates external forces and torques acting on the robot manipulator 1 and is determined by torque sensors 13 in the joints 7 and by strain gauges 15 on the links 5, a processing unit 105 designed to
a) indicate at least the components of each external wrench $F_{ext}$ that indicate the forces to be indicated in a base coordinate system, wherein the base coordinate system is a Cartesian coordinate system and arranged in a body-fixed manner on the base 3 of the robot manipulator 1, and an axis of the base coordinate system is parallel to a gravity vector;
b) determine a particular estimation of the weight of the load 11 from the particular component pointing in the direction of the gravity vector from among the components in the base coordinate system that indicate the external forces of each external wrench $F_{ext}$, and from the magnitude of the gravity vector;
c) determine a weight of the load 11 by averaging the respective estimations of the weight of the load 11;
d) determine estimations of coordinates of the center of gravity of the load 11 for each of the n static poses on the basis of the weight of the load 11 or the particular estimation of the weight of the load 11 determined for the particular static pose and on the basis of the components of the external wrench $F_{ext}$ that indicate the externally acting torques; and
e) determine the center of gravity of the load 11 by averaging the respective estimations of coordinates of the center of gravity.

FIGS. 3A-3D show, in addition to FIG. 1, the different static poses of the load 11 in more detail, but symbolically. The method is used for determining a weight and a center of gravity of a load 11 for a robot manipulator 1, wherein the robot manipulator 1 is arranged on a base 3 and has a plurality of links 5, and the links 5 are connected to one another by joints 7 and rotatable relative to one another by actuators 6 on the joints 5, and wherein the robot manipulator 1 has an end effector 9 for gripping the load 11. After gripping S1 the load 11 with the end effector 9, the load 11 is moved S2 into a number n of distinct static poses. These different static poses, denoted $q_1$, $q_2$, $q_3$, and $q_4$, are respectively shown in FIGS. 3A-3D. The load 11 is moved into a number m of the n static poses, with m≤n, several times from distinct directions, wherein, in this case, the following applies: m=n=4. Accordingly, the static poses are denoted with $q_1$, $q_2$, $q_3$, and $q_4$. An external wrench $F_{ext}$ is determined S3 for each of these static poses, wherein the respective external wrench $F_{ext}$ indicates external forces and torques acting on the robot manipulator 1 in an end effector coordinate system K. In this case, the external wrench $F_{ext}$ has six components. In this case, the first three components of the external wrench $F_{ext}$ describe forces, and the three adjoining components of the external wrench $F_{ext}$ describe detected torques. An external wrench $F_{ext}$ is determined for each of the n static poses in the end effector coordinate system K that is body-fixed to the end effector 9, and for determining S4 at least the components of each external wrench $F_{ext}$ that indicate the forces in a base coordinate system B, a system transformation between the end effector coordinate system K and the base coordinate system B is carried out. The base coordinate system B is a Cartesian coordinate system and imagined to be arranged in a body-fixed manner on the base 3 of the robot manipulator 1, and an axis of the base coordinate system B is parallel to the gravity vector given on site. Subsequently, a particular estimation of the weight of the load 11 is determined S5 from the particular component pointing in the direction of the gravity vector from among the components of each external wrench $F_{ext}$ that indicate the external forces in the base coordinate system B:

$$\hat{m}_{q1}g = -{}^{B}\hat{F}_{ext,K,q1}(3); \hat{m}_{q2}g = -{}^{B}\hat{F}_{ext,K,q2}(3);$$

$$\hat{m}_{q3}g = -{}^{B}\hat{F}_{ext,K,q3}(3); \hat{m}_{q4}g = -{}^{B}\hat{F}_{ext,K,q4}(3);$$

In this case, the subscript index "K" denotes the reference of the respective variable in front of the index to the end effector coordinate system K, and the superscript "B" in front of the respective variable denotes the notation in the base coordinate system B. In addition, g denotes the magnitude of the locally prevailing gravity vector. Furthermore, the expression ${}^{B}\hat{F}_{ext,K,q1}(3)$ by means of the indication "(3)" indicates the third component of the vectorially notated external wrench $F_{ext}$, valid for the respective pose $q_1$, or $q_2$, or $q_3$, or $q_4$. Accordingly, the terms $\hat{m}_{q1}g \ldots \hat{m}_{q4}g$ describe the particular estimations of the weight of the mass of the load for each of the poses $q_1$ to $q_4$.

The weight of the load 11 is determined S6 by arithmetic averaging of the respective estimations of the weight of the load 11:

$$mg = \frac{\hat{m}_{q1} + \hat{m}_{q2} + \hat{m}_{q3} + \hat{m}_{q4}}{4}g$$

Furthermore, estimations of coordinates of the center of gravity of the load 11 are determined S7 for each of the n static poses on the basis of the particular estimation of the weight of the load 11 determined for the particular static pose and on the basis of the components of the external wrench $F_{ext}$ that indicate the externally acting torques.

The estimations of coordinates are indicated with an index from x, y, z for the particular estimation, wherein the indication "(4)" indicates the fourth component of the vectorially notated external wrench $F_{ext}$, wherein the indication "(5)" indicates the fifth component of the vectorially notated external wrench $F_{ext}$, etc.

$$z_1 = \frac{{}^{K}\hat{F}_{ext,K,q1}(5)}{\hat{m}_{q1}g}; \quad z_2 = \frac{{}^{K}\hat{F}_{ext,K,q2}(4)}{\hat{m}_{q2}g};$$

$$z_3 = \frac{-{}^{K}\hat{F}_{ext,K,q3}(5)}{\hat{m}_{q3}g}; \quad z_4 = \frac{-{}^{K}\hat{F}_{ext,K,q4}(5)}{\hat{m}_{q4}g};$$

$$z_5 = \frac{-{}^{K}\hat{F}_{ext,K,q5}(4)}{\hat{m}_{q5}g}; \quad z_6 = \frac{-{}^{K}\hat{F}_{ext,K,q6}(5)}{\hat{m}_{q6}g};$$

$$z_7 = \frac{-{}^{K}\hat{F}_{ext,K,q7}(4)}{\hat{m}_{q7}g}; \quad z_8 = \frac{-{}^{K}\hat{F}_{ext,K,q8}(5)}{\hat{m}_{q8}g};$$

$$x_1 = \frac{-{}^{K}\hat{F}_{ext,K,q2}(6)}{\hat{m}_{q2}g}; \quad x_2 = \frac{{}^{K}\hat{F}_{ext,K,q4}(6)}{\hat{m}_{q4}g};$$

$$x_3 = \frac{{}^{K}\hat{F}_{ext,K,q5}(6)}{\hat{m}_{q5}g}; \quad x_4 = \frac{{}^{K}\hat{F}_{ext,K,q7}(6)}{\hat{m}_{q7}g};$$

$$y_1 = \frac{-{}^{K}\hat{F}_{ext,K,q1}(6)}{\hat{m}_{q1}g}; \quad y_2 = \frac{{}^{K}\hat{F}_{ext,K,q3}(6)}{\hat{m}_{q3}g};$$

$$y_3 = \frac{{}^{K}\hat{F}_{ext,K,q6}(6)}{\hat{m}_{q6}g}; \quad y_4 = \frac{-{}^{K}\hat{F}_{ext,K,q8}(6)}{\hat{m}_{q8}g}$$

In this case, the subscript index "K" denotes the reference of the respective variable in front of the index to the end effector coordinate system K, and the superscript "K" in front of the respective variable denotes the notation in the end effector coordinate system K. The center of gravity of the load 11 with the coordinates x, y, z is determined S8 by arithmetic averaging of the respective estimations for coordinates of the center of gravity of the load 11:

$$x = \frac{x_1 + x_2 + x_3 + x_4}{4}; y = \frac{y_1 + y_2 + y_3 + y_4}{4};$$
$$z = \frac{z_1 + z_2 + z_3 + z_4 + z_5 + z_6 + z_7 + z_8}{8};$$

In this case, x, y, z denote the respective coordinates of the center of gravity of the load.

Even though the invention has been illustrated and explained in greater detail using preferred embodiments, the invention is not limited by the disclosed examples, and other variations can be derived therefrom by a person skilled in the art without departing from the scope of protection of the invention. It is therefore clear that there is a plurality of possible variations. It is also clear that embodiments mentioned by way of example actually only constitute examples that are not to be interpreted in any way as a limitation of the scope of protection, of the potential applications, or of the configuration of the invention. Instead, the preceding description and the description of the figures enable a person skilled in the art to specifically implement the example embodiments, wherein a person skilled in the art, having knowledge of the disclosed inventive concept, is able to make numerous modifications, for example, with respect to the function or the arrangement of individual elements mentioned in an embodiment, without departing from the scope of protection, which is defined by the claims and their legal equivalents, such as a further explanation in the description.

LIST OF REFERENCE NUMERALS

1 Robot manipulator
3 Base
5 Links
6 Actuators
7 Joints
9 End effector
11 Load
13 Torque sensors
15 Strain gauges
100 System
101 Control unit
103 Estimation unit
105 Processing unit
S1 Gripping
S2 Moving
S3 Determining
S4 Determining
S5 Determining
S6 Determining
S7 Determining
S8 Determining

The invention claimed is:

1. A method of determining a weight and a center of gravity of a load for a robot manipulator, wherein the robot manipulator is arranged on a base and comprises a plurality of links, the links connected to one another by joints and movable or rotatable relative to one another by actuators on the joints, wherein the robot manipulator further comprises an end effector to grip the load, the method comprising:

gripping the load by the end effector,
moving the load into a number n of distinct static poses, wherein the load is moved into the number n of distinct static poses only by controlling a number k of actuators, with k≤n, wherein the number k is a predefined quantity and the k actuators are arranged on or assigned to k joints that are closest to the end effector;
determining an external wrench $F_{ext}$ for each of the n static poses, wherein a respective external wrench Fest indicates external forces and torques acting on the robot manipulator;
determining, in a base coordinate system, at least components of each external wrench $F_{ext}$ that indicate the external forces, wherein the base coordinate system is a Cartesian coordinate system and arranged in a body-fixed manner on the base of the robot manipulator, and an axis of the base coordinate system is parallel to a gravity vector;
determining a particular estimation of the weight of the load from a particular component pointing in a direction of the gravity vector from among the components of each external wrench $F_{ext}$ that indicate the external forces in the base coordinate system, and from the magnitude of the gravity vector;
determining the weight of the load by averaging respective estimations of the weight of the load for the n static poses;
determining estimations of coordinates of the center of gravity of the load for each of the n static poses based on the weight of the load as averaged and based on the components of the external wrench $F_{ext}$ that indicate the externally acting torques; and
determining coordinates of the center of gravity of the load by averaging respective estimations of coordinates of the center of gravity.

2. The method according to claim 1, wherein the external wrench $F_{ext}$ is determined by torque sensors in the joints.

3. The method according to claim 1, wherein the external wrench $F_{ext}$ is determined by strain gauges on the joints or on the links.

4. The method according to claim 1, wherein the load is moved several times from distinct directions into a number m of the n static poses, with m≤n.

5. The method according to claim 1, wherein n=8.

6. The method according to claim 1, wherein the external wrench $F_{ext}$ is determined for each of the n static poses in an end effector coordinate system that is body-fixed to the end effector, and for determining at least the components of each external wrench $F_{ext}$ that indicate the forces, a system transformation takes place in the base coordinate system between the end effector coordinate system and the base coordinate system.

7. The method according to claim 1, wherein estimations for coordinates of the center of gravity of the load are determined for each of the n static poses in an end effector coordinate system that is body-fixed to the end effector.

8. The method according to claim 1, wherein the center of gravity of the load is determined by arithmetic averaging of the respective estimations of coordinates of the center of gravity of the load.

9. The method according to claim 1, wherein the weight of the load is determined by arithmetic averaging of the respective estimations of the weight of the load.

10. A system to determine a weight and a center of gravity of a load for a robot manipulator, wherein the robot manipulator is arranged on a base and comprises a plurality of links, the links connected to one another by joints and rotatable relative to one another by actuators arranged on the joints, wherein the robot manipulator further comprises:
- an end effector designed to grip the load;
- a control unit designed to control the actuators arranged on the joints for moving the load into a number n of distinct static poses, wherein the load is moved into the number n of distinct static poses only by controlling a number k of actuators, with k≤n, wherein the number k is a predefined quantity and the k actuators are arranged on or assigned to k joints that are closest to the end effector:
- a processing unit; and
- a memory storing instructions that, when executed by the processing unit, cause the processing unit to perform operations comprising:
  - determining an external wrench $F_{ext}$ for each of the n static poses, wherein the respective external wrench $F_{ext}$ indicates external forces and torques acting on the robot manipulator;
  - determining, in a base coordinate system, at least components of each external wrench $F_{ext}$ that indicate the external forces, wherein the base coordinate system is a Cartesian coordinate system and arranged in a body-fixed manner on the base of the robot manipulator, and an axis of the base coordinate system is parallel to a gravity vector;
  - determining a particular estimation of the weight of the load from a particular component pointing in a direction of the gravity vector from among the components of each external wrench $F_{ext}$ that indicate the external forces in the base coordinate system, and from the magnitude of the gravity vector;
  - determining the weight of the load by averaging respective estimations of the weight of the load for the n static poses;
  - determining estimations of coordinates of the center of gravity of the load for each of the n static poses based on the weight of the load as averaged and based on the components of the external wrench $F_{ext}$ that indicate the externally acting torques; and
  - determining coordinates of the center of gravity of the load by averaging respective estimations of coordinates of the center of gravity.

11. The system according to claim 10, wherein the robot manipulator comprises torque sensors in the joints, the torque sensors designed to determine the external wrench $F_{ext}$.

12. The system according to claim 10, wherein the robot manipulator comprises strain gauges on the joints or on the links, the strain gauges designed to determine the external wrench $F_{ext}$.

13. The system according to claim 10, wherein the load is moved several times from distinct directions into a number m of the n static poses, with m≤n.

14. The system according to claim 10, wherein n=8.

15. The system according to claim 10, wherein the external wrench $F_{ext}$ is determined for each of the n static poses in an end effector coordinate system that is body-fixed to the end effector, and for determining at least the components of each external wrench $F_{ext}$ that indicate the forces, a system transformation takes place in the base coordinate system between the end effector coordinate system and the base coordinate system.

16. The system according to claim 10, wherein estimations for coordinates of the center of gravity of the load are determined for each of the n static poses in an end effector coordinate system that is body-fixed to the end effector.

17. The system according to claim 10, wherein the center of gravity of the load is determined by arithmetic averaging of the respective estimations of coordinates of the center of gravity of the load.

18. The system according to claim 10, wherein the weight of the load is determined by arithmetic averaging of the respective estimations of the weight of the load.

19. The method according to claim 1, wherein movement of the load into the n distinct static poses is capable of being carried out in a small portion of space associated with the k actuators arranged on or assigned to the k joints closest to the end effector.

20. The system according to claim 10, wherein movement of the load into the n distinct static poses is capable of being carried out in a small portion of space associated with the k actuators arranged on or assigned to the k joints closest to the end effector.

* * * * *